United States Patent [19]

Benedetto et al.

[11] Patent Number: 4,591,661

[45] Date of Patent: May 27, 1986

[54] PORTABLE CORDLESS TELEPHONE TRANSCEIVER-RADIO RECEIVER

[75] Inventors: Joseph A. Benedetto, 6446 Drexel Rd., Philadelphia, Pa. 19151; Neal H. Shepherd, Lynchburg, Va.

[73] Assignee: Joseph A. Benedetto, Philadelphia, Pa.

[21] Appl. No.: 641,124

[22] Filed: Aug. 15, 1984

[51] Int. Cl.[4] .............................................. H04Q 7/04
[52] U.S. Cl. ................................ 179/2 EA; 179/156 A
[58] Field of Search ........................... 179/2 E-2 EC, 179/2 B, 156 R, 156 A

[56] References Cited

U.S. PATENT DOCUMENTS

| | | | |
|---|---|---|---|
| 2,528,636 | 11/1950 | Cisin | 179/2 |
| 3,586,787 | 7/1971 | Vogelman et al. | 179/41 A |
| 3,962,553 | 6/1976 | Linder et al. | 179/41 A |
| 3,971,985 | 7/1976 | Arai | 325/21 |
| 4,053,717 | 10/1977 | Snider | 179/41 A |
| 4,310,732 | 1/1982 | Stearns et al. | 179/156 A |
| 4,484,029 | 11/1984 | Kenney | 179/2 EA |

FOREIGN PATENT DOCUMENTS 2806547 8/1979 Fed. Rep. of Germany .

OTHER PUBLICATIONS

Deka, Incorporated, "Deka Symmetry Headband", 1984 (flier), pp. 1 & 2.
Deka, Incorporated, "Deka Symmetry OpenEar", 1984 (flier), pp. 1 & 2.
Mechanix Illustrated, "Telephones Enter the Electronic Age", pp. 53-61, Jan. 1984.

*Primary Examiner*—Gene Z. Rubinson
*Assistant Examiner*—Robert G. Lev
*Attorney, Agent, or Firm*—Seidel, Gonda, Goldhammer & Abbott

[57] ABSTRACT

A portable cordless telephone transceiver-radio receiver includes a headset which is driven by the audio output of a radio receiver until an incoming radio frequency (RF) telephone ring signal is detected by a telephone receiver. A telephone audio ring signal is generated based on the detected RF ring signal and the audio ring signal is converted to sound at the headset. The audio ring signal operates a latch which blocks or squelches the audio output of the radio receiver from the headset until the latch is reset. A "talk/off" switch is operated by the user to initiate and terminate conversation and to automatically reset the latch. In another embodiment, the radio receiver is squelched or turned off directly by the "talk/off" switch. In a further embodiment, the audio ring signal is blocked from the head set until a prescribed number of audio ring signals have been detected.

10 Claims, 7 Drawing Figures

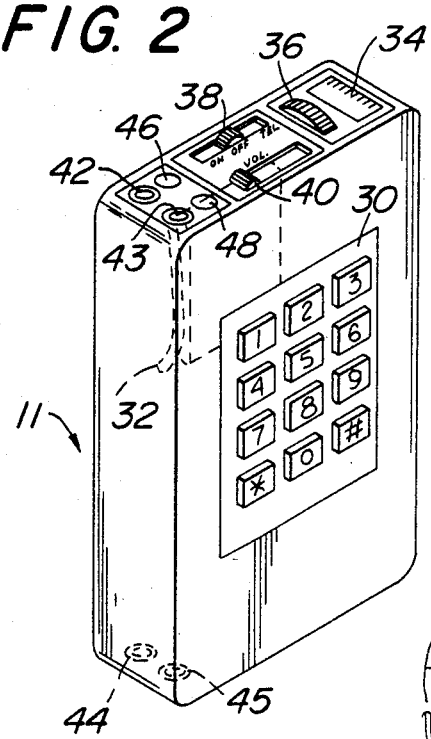
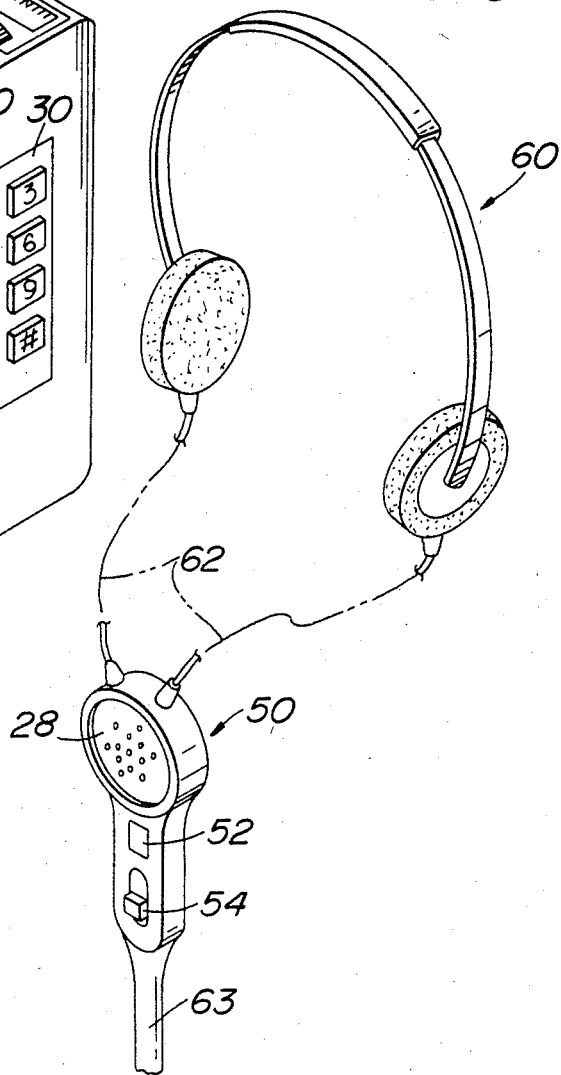

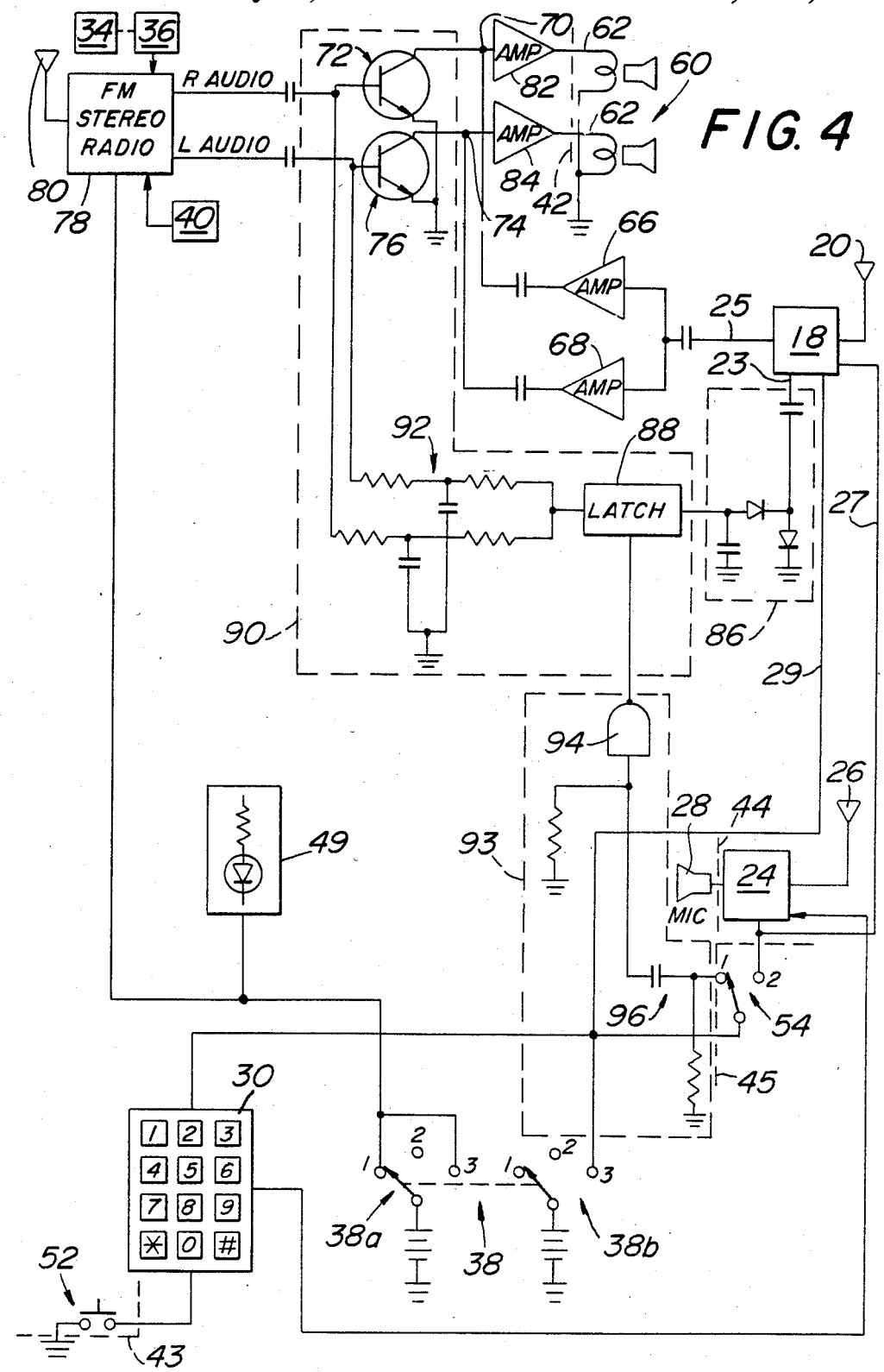

PORTABLE CORDLESS TELEPHONE TRANSCEIVER-RADIO RECEIVER

BACKGROUND OF THE INVENTION

The present invention is directed to a portable cordless telephone transceiver-radio receiver wherein the audio signal produced by the radio receiver is blocked from a headset during a telephone conversation.

U.S. Pat. No. 3,971,985 discloses a squelch control circuit for a transceiver and a radio or tape recorder wherein the radio or tape recorder is squelched so long as a transceiver signal is present and detected. U.S. Pat. No. 3,586,787 discloses a portable telephone transceiver and an earphone. U.S. Pat. No. 4,053,717 discloses a telephone transceiver employing Touch-Tone buttons.

U.S. Pat. No. 2,528,636 discloses a device which operates as a radio receiver or as a telephone amplifier. U.S. Pat. No. 4,310,732 discloses a microphone mounted on a pair of arms connected to head phones. U.S. Pat. No. 3,962,553 discloses a telephone transceiver wherein a two-position switch is employed to enable reception of a telephone signal and a voice operated transmitter.

It is an object of the present invention to provide a portable cordless telephone transceiver-radio receiver wherein the output of the radio receiver is squelched when an audio ring signal is generated and remains squelched during a subsequent telephone conversation after the ring signal has disappeared.

It is a further object of the invention to provide a portable cordless telephone transceiver-radio receiver wherein the radio receiver output is automatically squelched upon detection of the telephone audio ring signal.

It is a further object of the invention to provide the remote "talk/off" switch and "redial" switch which are mounted on a yoke or housing suspended from the headset.

Further objects and advantages of the invention appear hereinafter.

For the purpose of illustrating the invention, there is shown in the drawings a form which is presently preferred; it being understood, however, that this invention is not limited to the precise arrangements and instrumentalities shown.

FIG. 2 is a perspective of the portable cordless telephone transceiver-radio receiver of the present invention.

FIG. 3 is a perspective of a yoke or housing for mounting the microphone, "redial" switch and "talk/off" switch according to the invention.

FIG. 4 is an electrical schematic of a preferred embodiment of the portable cordless telephone transceiver-radio receiver of the present invention wherein the radio receiver output is automatically squelched upon detection of a telephone audio ring signal.

DETAILED DESCRIPTION OF THE INVENTION

Figure 1:
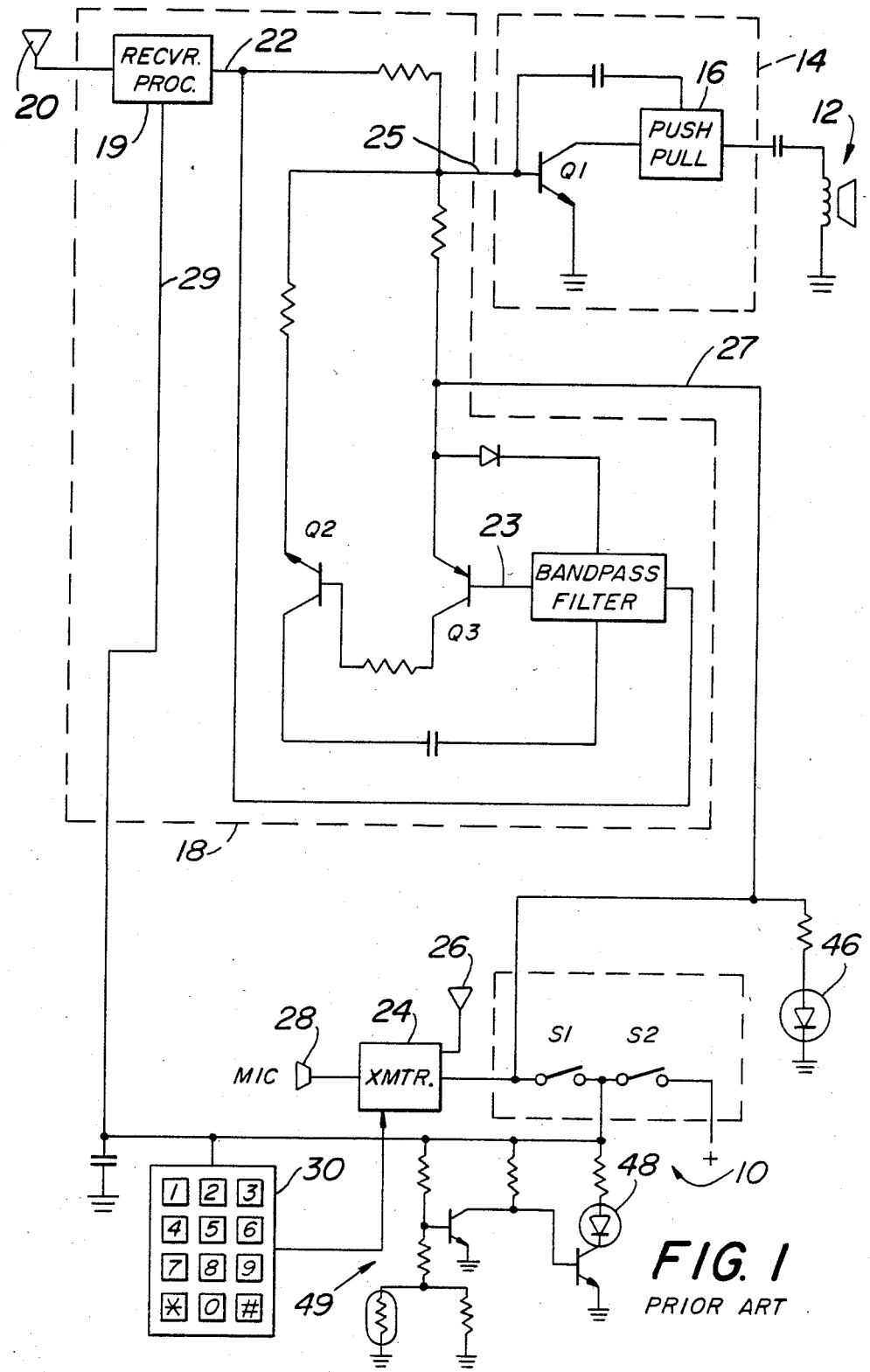
FIG. 1 is a schematic diagram of a portion of a conventional portable cordless telephone transceiver.

Referring to the drawings wherein like numerals indicate like elements, there is shown in FIG. 1 a conventional telephone transceiver circuit 10 for a portable cordless telephone transceiver. The transceiver circuit 10 includes a speaker 12 which is driven by an audio amplifier 14. The audio amplifier includes a transistor Q1 which drives a push-pull amplifier 16. Transceiver circuit 10 also includes a receiver 18 which is coupled to an antenna 20. The receiver receives incoming radio frequency (RF) telephone signals from a telephone base transponding unit (not shown). The receiver 18 includes a signal processor 19 comprising conventional amplifier, converter and detector stages. The audio output 22 of processor 19 may be a telephone audio speech signal (during conversation) or a telephone audio ring signal (prior to conversation). The audio output 22 is fed to the base of transistor Q1. The receiver 18 also includes a bandpass filter having a ring signal output 23 which is coupled to collector-coupled transistors Q2, Q3. The bandpass filter is centered at the nominal frequency of the audio ring signal. The emitters of transistors Q2, Q3 are connected via line 25 to the base of transistor Q1.

Battery power is applied to the receiver processor via line 29 and a "telephone standby" switch S2. Battery power is supplied to the emitter of transistor Q3 by a line 27 and "talk/off" switch S1. Switch S1 also supplies battery power to a transmitter 24. The transmitter is connected to a microphone 28 and sends RF telephone speech signals back to the base transponding unit by means of an antenna 26. A touch tone key pad and circuit 30 derives battery power via switch S2, and its output is coupled to transmitter 24.

The ring signal output of the bandpass filter is amplified by transistor Q1 and fed to speaker 12 so that the ring signal can be heard when switch S2 is closed and switch S1 is open. In between ring signals, no audio appears at the base of transistor Q1.

When switch S1 and switch S2 are closed, the ring signal is terminated and a conversation can be conducted with the caller. Switch S1 supplies battery power to the emitter of transmitter Q3 via line 27 so as to maintain transistor Q1 "on" throughout the conversation, i.e., until switch S1 is re-opened. While transistor Q1 is "on", telephone audio speech signals appearing at line 22 are amplified by the transistor and fed to speaker 12. The speaker converts the telephone audio speech signals to sound.

The conventional transceiver circuit also includes a "talk" indicator LED 46 which indicates that switch S1 is closed and that a conversation may be conducted. The circuit also includes a battery charge sensing circuit 49 provided with a "battery low" indicator LED 48 which indicates that the battery needs to be replaced or re-charged.

The casing 11 for the portable cordless telephone transceiver-radio receiver of the present invention is shown in FIG. 2. Preferably, the casing is pocket-sized. The rear of the casing is provided with a spring clip 32 so as to permit the unit to be clipped to a belt or pocket flap. At the top of the casing, there is mounted a graduated RF tuner scale 34 and tuner dial 36. A three position "radio/power off/telephone standby" switch 38 and a slide volume control switch 40 are located at a central portion of the top end of the casing. The casing is provided with jack receptacles 42, 43, 44, 45, a "stereo" indicator LED 46, and a "battery low" indicator LED 48. The jack receptacles connect the headset, microphone, "talk/off" switch and "redial" switch wires to the electronics as described hereafter.

The microphone 28 is mounted in a yoke or housing 50 as best shown in FIG. 3. The "redial" switch 52 is also mounted in housing 50 as is a two-position "talk/off" switch 54. A headset 60 is provided with leads 62 which pass through the housing 50 and run through a sheath 63 to the electronics via jack receptacle 42. The leads 62 also serve to suspend the housing 50 from the headset.

Referring to FIG. 4, there is shown a preferred embodiment of the electronics of the present invention. The electronics includes a telephone receiver 18 and telephone transmitter 24. The line 25 output of receiver 18, which carries telephone speech audio and ring audio signals, is split into two channels and amplified by amplifiers 66, 68. The output of amplifier 66 is summed at junction 70 with the output of a transistor 72. The output of amplifier 68 is summed at junction 74 with the output of a transistor 76. Transistor 72 drives junction 70 with the right channel audio output of a conventional FM stereo radio receiver circuit 78. Transistor 76 drives junction 74 with the left channel audio output of radio receiver circuit 78. The radio receiver circuit is coupled to an antenna 80. The summing junctions 70, 74 are coupled to the inputs of amplifiers 82, 84 respectively. The amplifiers drive the headset 60.

The FM stereo radio receiver circuit 78 is a conventional circuit such as the type used in a portable pocket-sized radio. The radio receiver circuit 78, telephone receiver 18 and telephone transmitter 24 are all part of the electronics shown in FIG. 4 and are located within casing 11 (FIG. 2). The FM stereo radio receiver circuit 78 is powered by a battery coupled to the "radio/power off/telephone standby" switch 38 which comprises ganged double pole triple throw switches 38a, 38b. Telephone receiver 18 is also powered by the battery and switches 38a, 38b. Thus, when switches 38a, 38b are in the #1 position ("radio"), power is applied to radio receiver circuit 78 but not telephone receiver 18. The left and right channel audio outputs of radio receiver circuit 78 are fed to transistors 72, 76 which drive amplifiers 82, 84 respectively so as to reproduce sound at the headset 60. Accordingly, when switches 38a, 38b are in the #1 position ("radio") only the radio circuit 78 is powered, and the telephone receiver 18 and telephone transmitter 24 are off.

When switches 38a, 38b are in the #2 position ("power off"), no power is delivered to radio circuit 78 or to receiver 18 or transmitter 24.

When switches 38a, 38b are in the #3 position ("telephone standby"), power is delivered via switch 38a to radio receiver circuit 78. Power is also delivered by switch 38b and line 29 to telephone receiver circuit 18 and to the "talk/off" switch 54. An RF telephone ring signal received at antenna 20 is processed by receiver 18 and fed over line 25 to amplifiers 66, 68 whereby the ringing sound is reproduced at headset 60. The output of the band pass filter is fed over line 23 to a rectifier circuit 86 which rectifies up the ring signal. The output of rectifier circuit 86 sets a latch 88 which, together with transistors 72, 76, forms part of a squelch control circuit 90. When the latch is set, it cuts off transistors 72, 76 via resistive-capacitive circuit 92. Thus, upon detection of the ring signal at receiver 18, the squelch control circuit 90 automatically squelches the left and right audio channel outputs of radio receiver circuit 78. Only the audio ring signal on line 25 is heard at the headset 60. Accordingly, the ring signal is readily heard by the user.

To initiate a telephone conversation, while the radio receiver circuit is squelched, the user transfers switch 54 from position #1 ("off") to position #2 ("talk"). Since switch 38b is in the #3 position ("telephone standby"), transfer of switch 54 to the #2 position ("talk") applies power to transmitter 24. Thus, receiver 18 and transmitter 24 are powered to enable a two way conversation with the caller.

Switch 54 is also connected to a pulse generator circuit 93 which is used to reset latch 88 at the conclusion of a telephone conversation. A variety of condition-sensitive pulse generator circuits 93 may be employed. The specific circuit shown in FIG. 4 is exemplary only and is not intended to be limiting. Throughout a telephone conversation, the latch maintains transistor 72, 76 cut-off so as to squelch the left and right audio channels of radio receiver circuit 78. When switch 54 is first transferred to the #2 position ("talk") the voltage at the input of a gate 94 drops as a capacitor 96 discharges to ground. This marks the initiation of the telephone conversation, and latch 88 remains unaffected (set). At the conclusion of a telephone conversation, switch 54 is transferred back to the #1 position ("off"), cutting off transmitter 24 and re-applying power to capacitor 96. The capacitor recharges causing a voltage increase of the input of gate 94. The gate output resets latch 88 in response. When latch 88 is reset, the latch output frees transistors 72, 76 so that the transistors drive amplifiers 82, 84 in response to the right and left audio channel outputs of radio receiver circuit 78. The headset 60 therefore reproduces the right and left channel audio sounds.

Thus, in the electronics shown in FIG. 4 the ring signal is heard over the headset 60 so as to notify the operator that an incoming call is being received. The ring signal is automatically squelched by the line 27 input to receiver 18 when the "talk/off" switch 54 is first transferred to the #2 position ("talk"). The radio audio output channels are automatically squelched upon detection of an incoming ring signal. The radio audio output channels remain squelched until the "talk/off" switch 54 is transferred by the operator back to the "off" (#1) position.

The electronics of the present invention also includes keypad and Touch-Tone circuit 30. The circuit is connected to switch 38b so as to draw power when the switch is in the #3 ("telephone standby") position. The "redial" switch 52 is connected to circuit 30. It will be recalled that the "redial" switch is located at the microphone housing 50 so as to provide the operator with a convenient opportunity to redial a call number.

Figure 5:
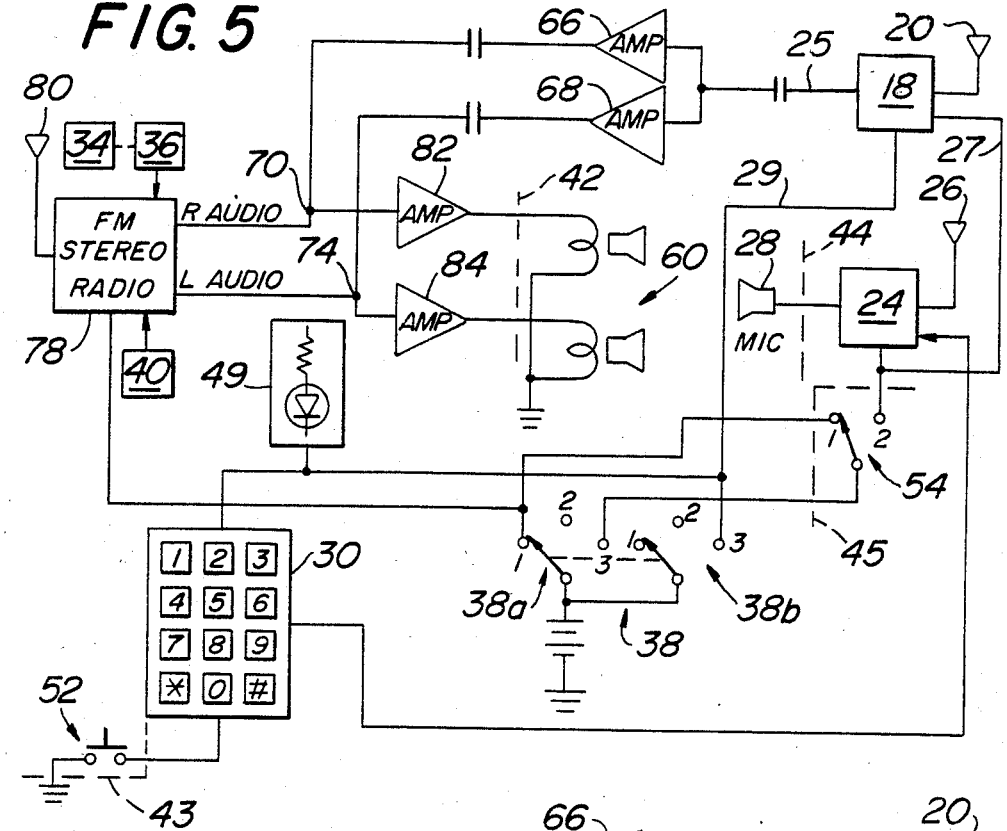
FIG. 5 is an electrical schematic of another embodiment of the portable cordless telephone transceiver-radio receiver of the present invention wherein the radio receiver is turned off by the "talk/off" switch.

Referring to FIG. 5, there is shown an alternate embodiment of the invention wherein the right and left audio channel outputs of the radio receiver circuit are not squelched by the ring signal but wherein power to the radio receiver circuit is cut-off during the telephone conversation by operation of "talk/off" switch 54.

When switches 38a, 38b are in the #1 position ("radio"), power is applied to radio receiver circuit 78 but not telephone receiver 18 or telephone transmitter 24. The left and right audio channel outputs of radio receiver circuit 78 are converted to sound by headset 60.

When switches 38a, 38b are transferred to the #2 position ("power off"), no power is applied to radio receiver circuit 78 or receiver 18 or transmitter 24.

When switches 38a, 38b are transferred to the #3 position ("telephone standby") while switch 54 is in the #1 position ("off"), power is applied to radio receiver circuit 78 and to telephone receiver 18. If an incoming ring signal is detected by the telephone receiver, it is fed via amplifiers 66, 68 and 82, 84 to headset 60. The ring sound is superimpoed on the left and right channel audio outputs of the radio receiver. Thus, reception and detection of the ring signal does not result in squelching of the radio receiver circuit 78.

To initiate a telephone conversation, the operator transfers "talk/off" switch 54 to position #2 ("talk") while switches 38a, 38b are in the #3 position ("telephone standby"), thereby applying power to transmitter 24 while removing power from radio radio receiver circuit 78. Thus, the right and left audio channel outputs of the radio receiver circuit are squelched. The radio receiver circuit outputs remain squelched so long as the "talk/off" switch 54 remains in position #2 ("talk").

Figure 6:
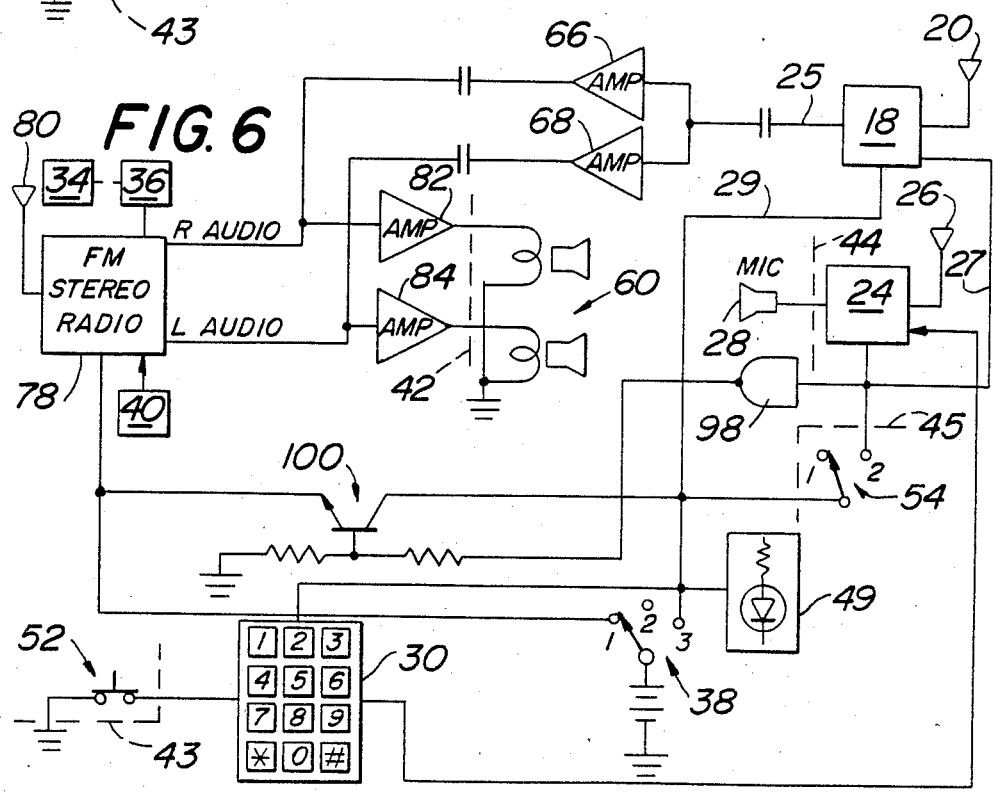
FIG. 6 is an electrical schematic of a further embodiment of the portable telephone transceiver-radio receiver of the present invention wherein the radio receiver is turned off by the "talk/off" switch via a transistor and gate.

Referring to FIG. 6, there is shown a further embodiment of the invention wherein ganged switches 38a, 38b are replaced by a single switch 38. The "talk/off" switch 54 is connected to radio receiver circuit 78 by a gate 98 and a transistor 100. Operation is substantially identical to that of the embodiment shown in FIG. 5.

When switch 38 is in position #1 ("radio"), power is applied to radio receiver circuit 78 but not to receiver 18 or transmitter 24.

When switch 38 is in position #2 ("power off"), no power is applied to radio receiver circuit 78 or receiver 18 or transmitter 24.

When switch 38 is in position #3, ("telephone standby") while switch 54 is in position #1 ("off"), power is applied to keypad circuit 30 and receiver 18. Power is also applied to radio receiver circuit 78 by transistor 100 which is maintained "on" by the output of gate 98. No power is applied to transmitter 24.

To initiate a telephone conversation, "talk/off" switch 54 is transferred to the #2 position ("talk") while switch 38 is in the #3 position ("telephone standby"). The output of gate 98 therefore changes so as to cut off transistor 100 and radio receiver circuit 78. This squelches the left and right audio channel outputs of the radio receiver circuit. The radio receiver circuit remains squelched so long as switch 54 remains in the #2 position ("talk"). To terminate the conversation, switch 54 is transferred back to the #1 position ("off"). Accordingly, gate 98 turns transistor 100 back "on", applying power to radio receiver circuit 78 so that the audio output of the circuit is heard at the headset.

Figure 7:
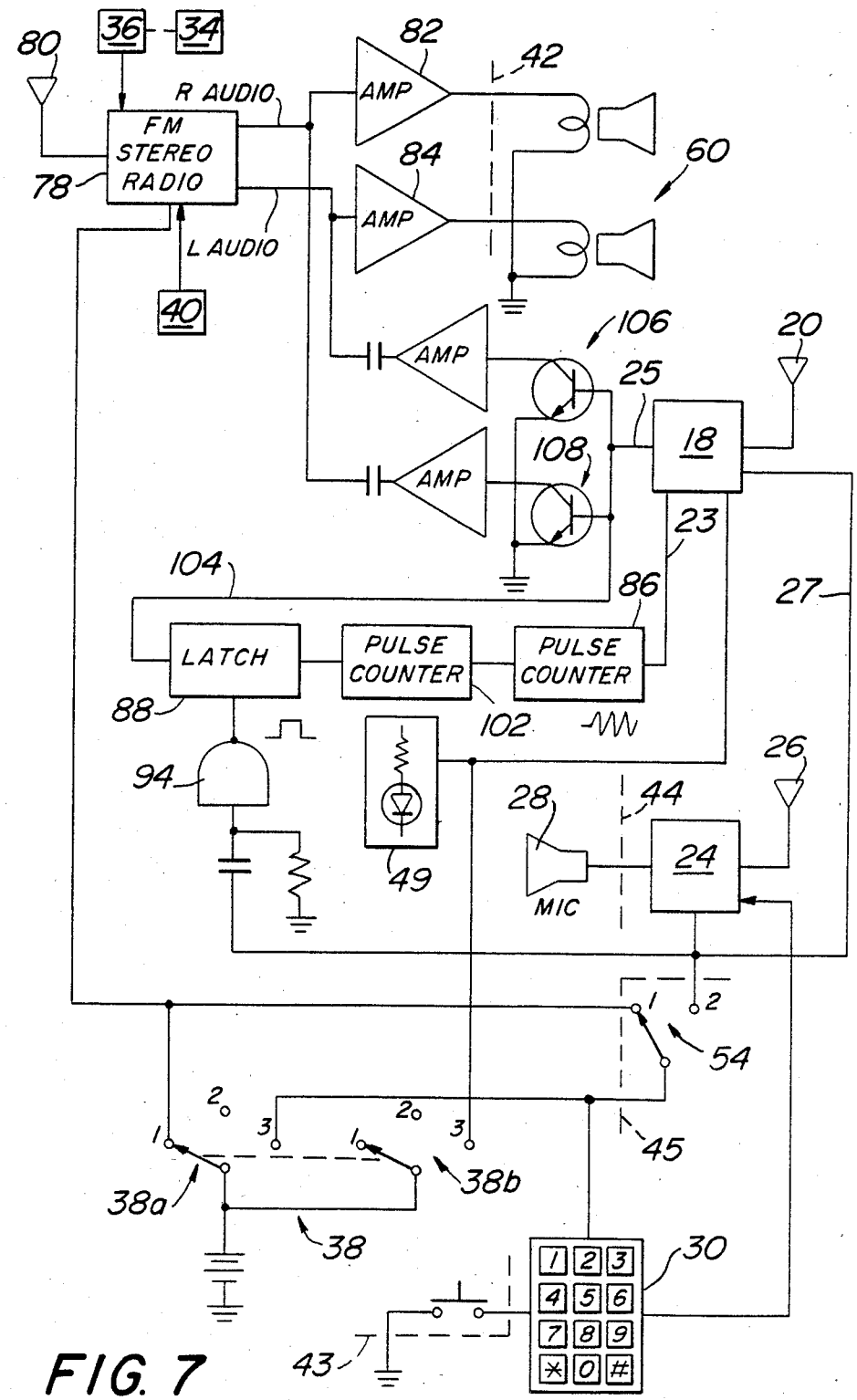
FIG. 7 is an electrical schematic of a further embodiment of the portable cordless telephone transceiver-radio receiver of the present invention wherein the telephone audio ring signal is temporarily squelched.

Referring to FIG. 7, there is shown a further embodiment of the invention wherein a predetermined number of ring signals are detected and counted before succeeding ring signals are applied to the headset 60. Operation is similar to that of the embodiment shown in FIG. 4.

When switches 38a, 38b are in the #1 ("radio") position, power is applied to radio receiver circuit 78 but not to receiver 18 or transmitter 24.

When switches 38a, 38b are in the #2 position ("power off"), no power is applied to radio circuit 78 or receiver 18 or transmitter 24.

When switches 38a, 38b are in the #3 ("telephone standby") position while switch 54 is in the #1 position ("off"), power is applied to radio receiver circuit 78 via switch 38a and switch 54. Power is also applied by switch 38b to receiver 18. When an incoming ring signal is detected by receiver 18, the ring signal is processed by pulse shaper circuit 86 and the ring output pulses are then counted by counter 102. The counter 102 is preset or arranged to count to a preselected number and then reset itself while setting latch 88. Before the latch is set, the latch output 104 maintains transistors 106, 108 cut off so that no ring signals can be heard at headset 60. When the latch is set, the latch output turns transistors 106, 108 "on", thereby passing all succeeding audio ring signals on line 25 to headset 60.

When it is desired to initiate a telephone conversation, "talk/off" switch 54 is transferred to the #2 position ("talk") while switches 38a, 38b are in the #3 position ("telephone standby"). This removes power from radio receiver circuit 78, thereby squelching the left and right audio output channels. Transfer of switch 54 to the #2 position ("talk") also produces a voltage level change at the input of gate 94. In response, the gate resets latch 88. Latch output 104 therefore turns transistors 106, 108 "on" so that telephone speech audio on line 25 can be heard at headset 60.

When it is desired to terminate the conversation, switch 54 is transferred back to the #1 position ("off"), cutting off power to transmitter 24. If switch 38b remains in the #3 position ("telephone standby") new incoming calls can be detected and a conversation conducted as already described.

The present invention may be embodied in other specific forms without departing from the spirit or essential attributres thereof and, accordingly, reference should be made to the appended claims, rather than to the foregoing specification, as indicating the scope of the invention.

We claim:

1. Portable cordless telephone transceiver-radio receiver comprising:
   (a) a radio receiver circuit for receiving broadcast RF signals and for generating audio signals based thereon,
   (b) a telephone receiver circuit for receiving broadcast RF telephone speech and ring signals and for generating audio speech and ring signals based thereon,
   (c) a headset adpated to be coupled to said radio receiver circuit and to said telephone receiver circuit for producing sound based on said radio receiver circuit audio signals and said telephone receiver circuit audio speech and ring signals,
   (d) settable/resettable blocking means for blocking said radio receiver circuit audio signals from reaching said headset when set and for passing said radio receiver circuit audio signals to said headset when reset,
   (e) means for detecting presence or absence of said telephone receiver circuit audio ring signal and for automatically setting said blocking means when a telephone receiver circuit audio ring signal is detected, and
   (f) operator manipulable switch means for resetting said blocking means.

2. Portable cordless telephone transceiver-radio receiver according to claim 1 wherein said blocking means includes a latch having an output coupled to a pair of switching transistors which pass or block the audio receiver circuit audio signals based on the latch output.

3. Portable cordless telephone transceiver-radio receiver comprising:
   (a) radio receiver circuit for receiving broadcast RF and for producing audio signals based thereon when power is supplied thereto,
   (b) telephone receiver circuit for receiving broadcast RF telephone speech and ring signals and for producing audio speech and ring signals based thereon when power is supplied thereto,
   (c) headset adapted to be coupled to said radio receiver circuit and to said telephone receiver circuit for producing sound based on said audio signals,
   (d) first operator manipulable switch means for providing power to said radio receiver circuit but not said telephone receiver circuit when in a first position and for providing power to said telephone receiver circuit and to a second operator manipulable switch means when in a second position,
   (e) second operator manipulable switch means coupled to said first operator manipulable switch means and said radio receiver circuit for completing a circuit path to said radio receiver circuit so at to provide power to the radio receiver circuit when in a first position and for opening said circuit path so as to cut off power to said radio receiver circuit when in a second position.

4. Portable cordless telephone transceiver-radio receiver circuit according to claim 3 wherein said circuit path includes a gate coupled to a transistor switch between said radio receiver circuit and said second operator manipulable switch means.

5. Portable cordless telephone transceiver-radio receiver circuit comprising:
   (a) radio receiver circuit for receiving broadcast RF signals and for producing audio signals based thereon when power is supplied thereto,
   (b) telephone receiver circuit for receiving broadcast RF speech and ring signals and for producing audio speech and ring signals based thereon when power is supplied thereto,
   (c) headset adapted to be coupled to said radio receiver circuit and to said telephone receiver circuit for producing sound based on said audio signals,
   (d) settable/resettable blocking means for blocking a preselected number of audio ring signals from said headset when reset and for passing audio ring signals to said headset when set,
   (e) means for detecting a preselected number of audio ring signals and for setting said blocking means in response,
   (f) first operator manipulable switch means for providing power to said radio receiver circuit but not said telephone receiver circuit when in a first position and for providing power to said telephone receiver circuit and a second operator manipulable switch means when in a second position,
   (g) second operator manipulable switch means coupled to said first operator manipulable switch means for completing a circuit path to said radio receiver circuit so as to provide power thereto when in a first position and for opening said circuit path so as to cut off power to said radio receiver circuit when in a second position, and
   (h) means coupled to said second operator manipulable switch means for resetting said blocking means so as to cause said blocking means to pass audio ring signals to said headset when said second operator manipulable switch means is in said first position.

6. Portable cordless telephone transceiver-radio receiver according to claim 5 wherein said blocking means includes a counter and a resettable latch connected thereto, and a pair of transistors connected to the output of said latch.

7. Portable cordless telephone transceiver-radio receiver according to claim 6 wherein said resetting means is connected between said latch and said second operator manipulable switch means.

8. Portable cordless telephone transceiver-radio receiver according to claim 1 including a yoke associated with said headset, said operator manipulable switch means being mounted on said yoke.

9. Portable cordless telephone transceiver-radio receiver according to claim 3 including a yoke associated with said headset, said second operator manipulable switch means being mounted on said yoke.

10. Portable cordless telephone transceiver-radio receiver according to claim 5 including a yoke associated with said headset, said second operator manipulable switch means being mounted on said yoke.

* * * * *